Sept. 10, 1940.  A. P. DE SEVERSKY  2,214,722
AIRCRAFT STRUCTURE
Filed Sept. 24, 1937  4 Sheets-Sheet 1

INVENTOR
ALEXANDER P. de SEVERSKY
BY
Hammond & Littell
ATTORNEYS.

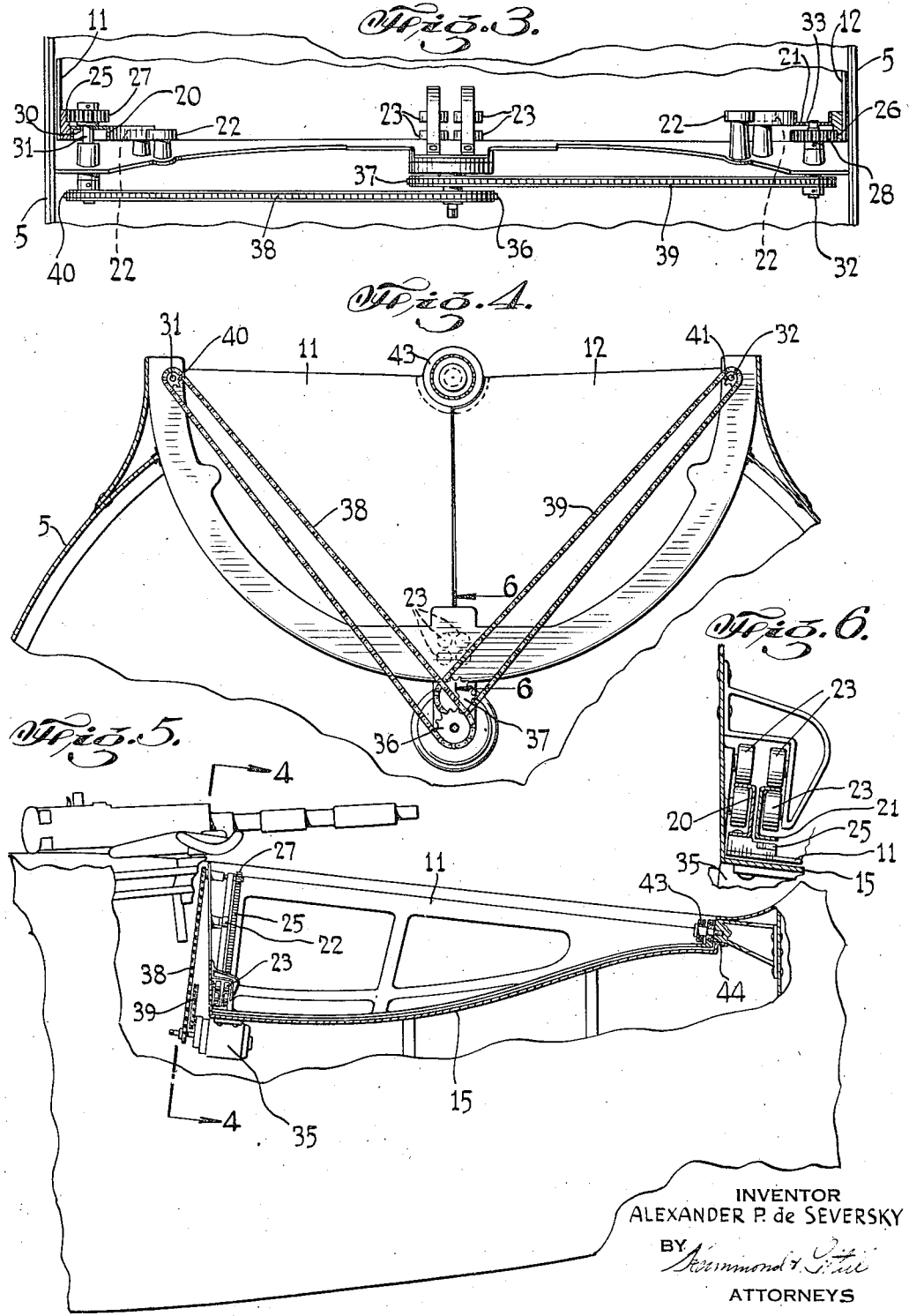

Sept. 10, 1940.  A. P. DE SEVERSKY  2,214,722
AIRCRAFT STRUCTURE
Filed Sept. 24, 1937  4 Sheets-Sheet 3
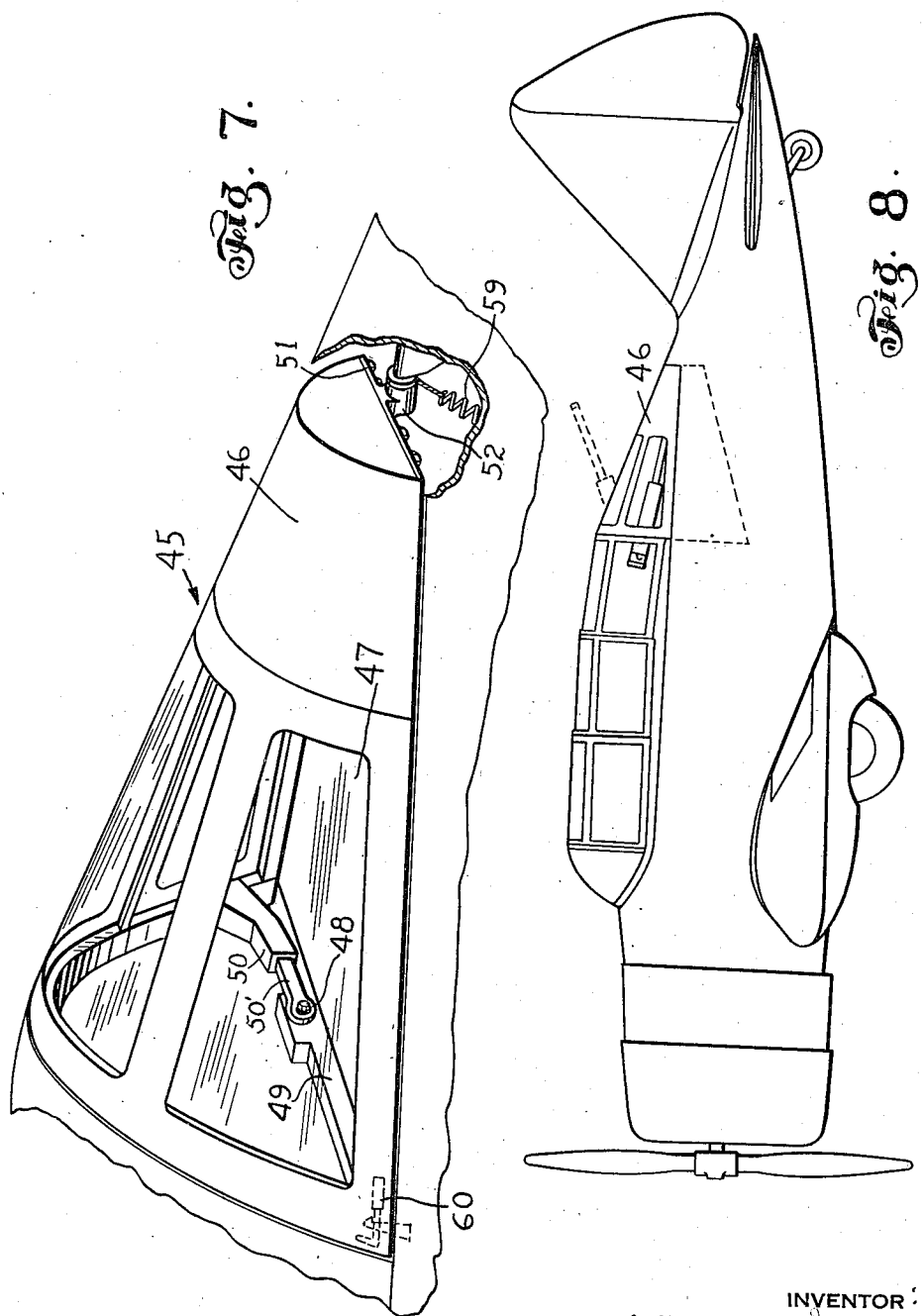
INVENTOR:
ALEXANDER P. de SEVERSKY;
BY:
Robert C. Rasche,
his ATTORNEY.

Sept. 10, 1940.  A. P. DE SEVERSKY  2,214,722
AIRCRAFT STRUCTURE
Filed Sept. 24, 1937  4 Sheets-Sheet 4

INVENTOR:
ALEXANDER P. de SEVERSKY;
BY:
his ATTORNEY.

Patented Sept. 10, 1940

2,214,722

UNITED STATES PATENT OFFICE 2,214,722

AIRCRAFT STRUCTURE

Alexander P. de Seversky, Northport, N. Y., assignor to Seversky Aircraft Corporation, a corporation of Delaware Application September 24, 1937, Serial No. 165,450

13 Claims. (Cl. 244—121)

The present invention relates to airplane structure, and more particularly to airplanes with open cockpits, and canopies therefor.

In certain aircraft a gun is mounted in the rear cockpit or the rear of the single cockpit, and may be advantageously housed within the canopy. When the gun is to be used the canopy would constitute an obstruction and it is desirable to eradicate this obstruction. The present invention aims to provide an effective arrangement whereby a portion of the canopy can be moved to stored position within the fuselage to provide as far as possible an uninterrupted field of view and operation for the gunner.

It is also an object to provide a complete cockpit cover which will include an improved turtle-deck, the whole canopy arranged for convenient opening by the gunner.

It is a further object to provide novel arrangements whereby the cover may be quickly and simply operated for gun action, either by hand or power means.

The nature and objects of the invention will be better understood from the description of a selected illustrative embodiment for the purposes of which description reference should be had to the accompanying drawings forming a part hereof but it is to be understood that the invention is limited in its embodiments only by the scope of the subjoined claims.

In these drawings,

Figure 3 is a sectional view taken on the line 3—3 of Fig. 2;

Figure 4 is a sectional view taken on the line 4—4 of Fig. 5;

Figure 5 is a central longitudinal sectional view showing the turtle back cover in stored position and the gun in position for use;

Figure 6 is a sectional detail view taken on line 6—6 of Fig. 4 showing the guiding rollers for the cover sections;

Figure 7 is a perspective, partly broken away, of a modified form;

Figure 8 is a diagrammatic side elevation of this modified form in use with a gun, both being shown in alternative positions;

Figure 1:
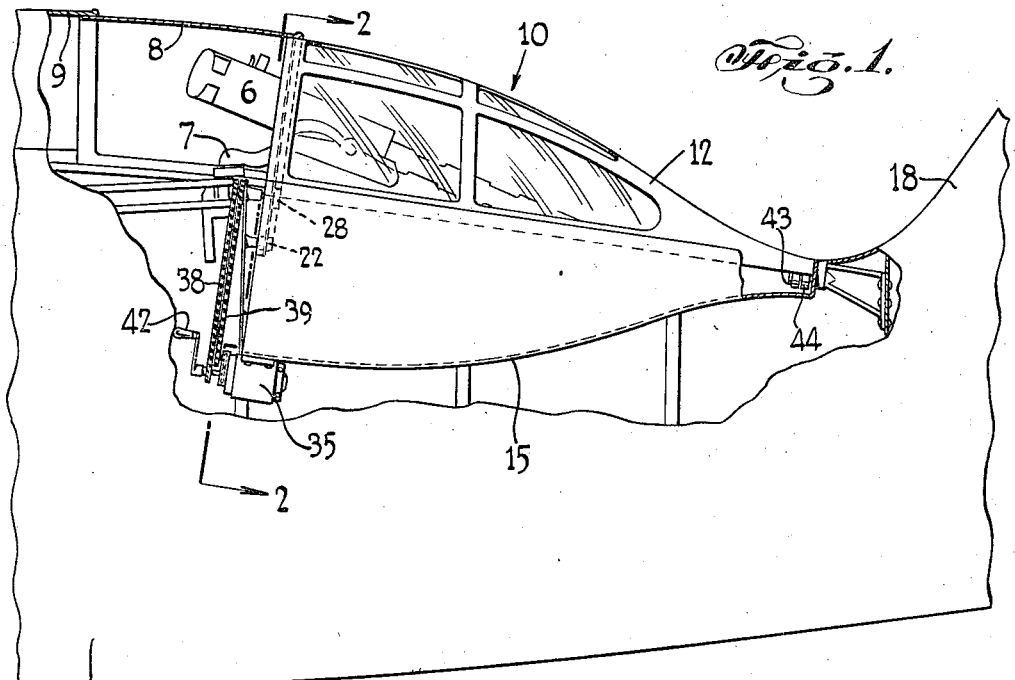
Figure 1 is a view partly in side elevation and partly in section of a novel disappearing canopy construction embodying the inventive concepts.
Figure 2:
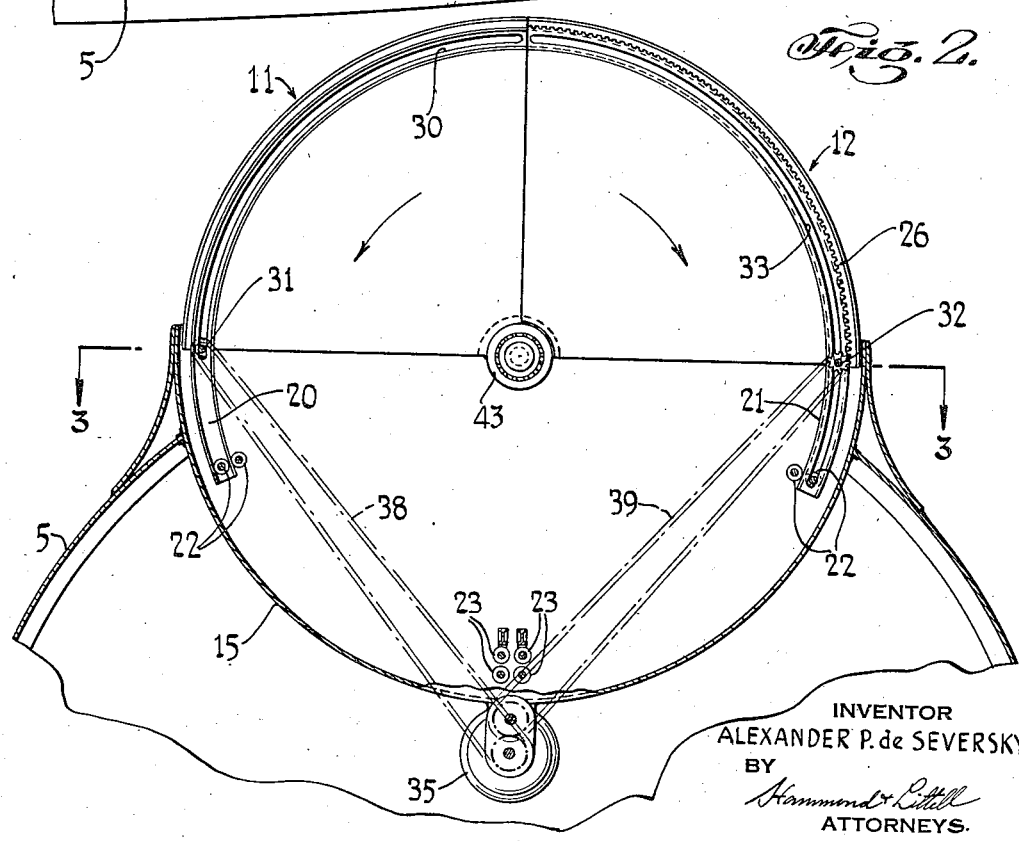
Figure 2 is a sectional view taken on the line 2—2 of Fig. 1.

In the construction more particularly shown in Figures 1, 2, 3, 4, 5 and 6 of the drawings for the purposes of illustration, the aircraft has a fuselage 5 provided with a cockpit at the rear of which is a gun 6 carried on a gun-mount 7. The cockpit cover comprises a member 8 which may slide forward within the cover member 9, which latter may be either stationary or movable, as conditions require. At the rear of the slidable cover member 8, a turtle back or deck 10 completes the cockpit covering and is streamlined as usual. In order that the gun may be freely used without obstruction, the turtle back 10 is retractable to stowed position within the fuselage. As shown, it is formed in two sections 11, 12 which are movable in opposite directions to retracted position within the fuselage. In the arrangement shown, the two halves are guided to move downward into the fuselage and a shell 15 forms a recess to receive the two sections. There is ample space therein for the two sections and they need not necessarily move downward to such a position that they overlap with one nesting within the other. The rear end of the turtle back is substantially closed and of relatively small diameter, for which reason it is convenient to mount the sections on rotatable bearings 43, 44 just forward of the fin 18. The forward end of the turtle back is open, to provide an unobstructed space for the gun and provision is made for suitably guiding this end of the two sections as the same are moved to stowed position. As a convenient means for guiding the sections, the sections 11 and 12 are provided with channel members 20 and 21, respectively, which are guided between pairs of rollers 22 at the sides and pairs of rollers 23 at the bottom.

The sections 11 and 12 also carry arcuate racks 25 and 26 which are engaged and driven by pinions 27 and 28, respectively, to move the sections from their uppermost operative positions, to their lowermost stowed positions, and vice-versa. Any other suitable operating means may be substituted without going beyond the scope of the present invention.

It will be noted that the racks 25 and 26 lie between the channel members 20 and 21 and the respective sections 11 and 12, and may be secured by the same rivets or bolts which secure the channel members to the sections. As is evident from Figures 2, 3 and 5, the channel member 20 is slotted at 30 to receive the shaft 31, which carries the rack-driving pinion 27 and the shaft engaging in this slot cooperates with the rollers 22 to guide the section 11. The shaft 32 carrying rack-driving pinion 28 is also extended and engages a slot 33 in the channel member 21. It will be noted that the channel members 20 and 21 extend downwardly beyond the edges of the cover sections 11 and 12 when the same are in their uppermost or closed position and when the sections are moved to open and stowed position the ends of the channel members overlap as shown in Fig. 6. The slot 33 is extended and receives the shaft of one of the rollers 22. The rollers 22 may be supported on a bracket as in Fig. 6 and the slot 33 made shorter, if preferred. The rack members however are shown as substantially shorter and these abut each other and form stops for the sections when moved to their stored position.

It is contemplated to provide power means for moving the sections and for this purpose an electric motor 35 is connected by oppositely driven sprocket wheels 36, 37 and sprocket chains 38, 39 to sprocket wheels 40, 41 secured on the shafts 31, 32 which carry the rack-driving pinions 27 and 28. In order that the sections may be actuated by hand in the event of difficulty with the electric motor, a hand crank 42 is connected to the sprocket wheel 36. A quick acting clutch (not shown on the drawings but of any well-known type) is provided to disconnect the motor from the sprocket wheel 36. It will be understood that the motor 35 is reversible and that the gearing-connection between it and the sprocket wheels 36, 37 is such as to drive the same in opposite direction. However, this gearing is only conventionally shown in the present drawings.

The rear ends of the sections 11 and 12 are suitably mounted for rotation. As shown the two sections are carried respectively by ball bearings 43, 44, which may, if desired, be coaxial in the manner shown in Fig. 5.

In Figures 7, 8, 9, and 10 is shown a modification of the afore-described embodiment, constituting somewhat of a simplification thereof, well adapted for quantity production on the large scale. In this latter form, the disappearing gun is at least partially housed by its muzzle, when not in use, in a unitary, rotatable, snap-open canopy member 45 forming a continuation of the sliding, forward canopy members 8, 9 etc. In the drawings, this member 45 comprises a unitary streamlined framework 46 having suitable glassed openings 47 for permitting rear vision even when closed. The entire unitary turtleback is mounted to revolve on occasion, on an axis substantially parallel to the center-line of the aircraft, having a bearing 48 on a structural tie-bar 49 of the 'plane, the connection from the bearing to the framework of the turtle-deck being effectuated by a link 50', mounted in a hollow, cranked arm 50 rigidly unitary with the framework of the member 45.

Figure 10:
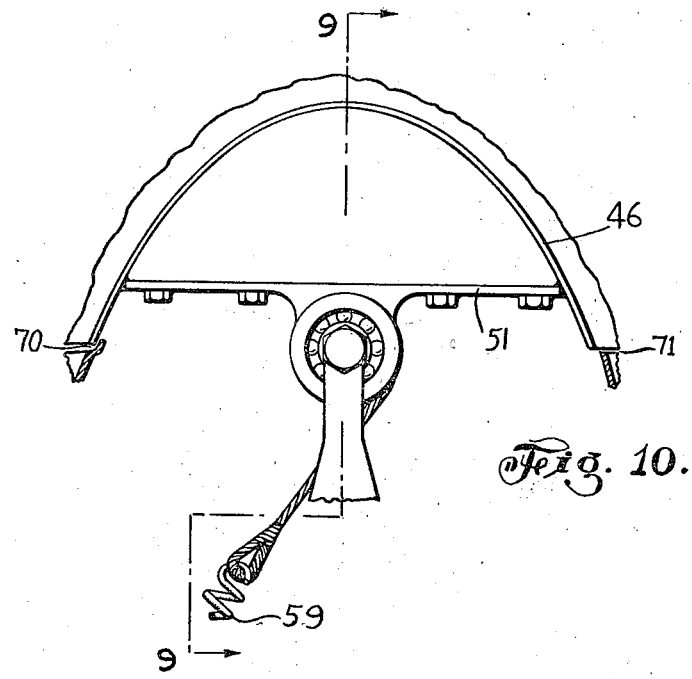
Figure 10 is a view along line 10—10 of Fig. 9.
Figure 9:
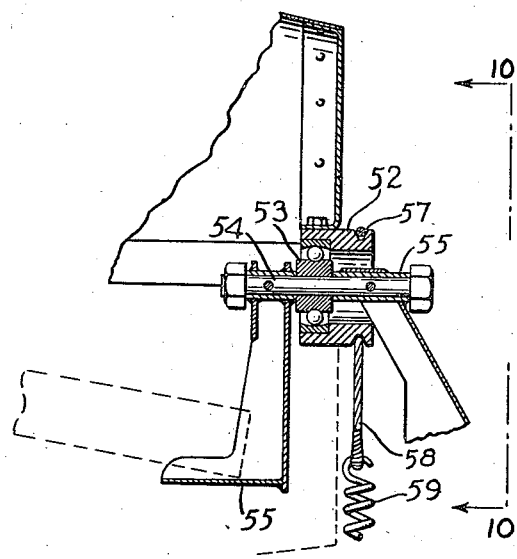
Figure 9 is a detailed section on line 9—9 of Fig. 10.

The other end of the member 45 is rotatably mounted, as shown in Figures 9 and 10 by means of a tie-bar 51 having integral therewith a sleeve or collar 52 carrying a ball-bearing 53. The bearing 53 bears on a journal provided by a double-ended bolt 54 pinned near one end to a hanger for the gun muzzle through a suitable bushing, the bolt 54 being pinned at its other end through a suitable sleeve 55', integral with a bracket attached to an after-bulkhead of the aircraft.

As best shown in Figures 9 and 10, the rear periphery of the sleeve 52 bears a deep groove, or pulleyway, 57, around which passes a flexible metal cable 58. This cable bears a continuously tensional helical spring 59, constituting power means, so that the entire turtleback tends to rotate in the clockwise direction, viewing Fig. 10. A latch group 60 for controlling the operation of the spring is provided as in Fig. 7, and comprises a male member on the fuselage always engaging a female member on the turtle-deck to restrain the deck against its constant tendency to fly open. When the latch is released, by merely tripping the male member, then, without any attention or further manipulation by the gunner, this aftermost part of the canopy flies open, upwardly and over towards the starboard side and down alongside, and parallel to, the curve of the fuselage in this region, as shown in dotted lines in Fig. 8. The disappearing gun can then be elevated and trained for action in all directions, as shown in dotted lines in Fig. 8.

To make the gun disappear from view, it is only necessary to depress it on its mount until its muzzle is seated as in Fig. 9, whereupon a slight twisting pull counter-clockwise on the member 60 or anywhere on the turtledeck, will bring it into close enough relationship to the latch on the fuselage to lock it in raised, covering position.

Suitable water-tight joints 70, 71, are provided on the respective edges of the member 45 and of the fuselage.

It is to be understood that the foregoing descriptions are given by way of example, only, and that the inventive concepts are limited in their embodiments only by the scope of the subjoined claims.

It should also be observed that in case circumstances should arise, in flight, necessitating the occupant of the rear cockpit to leave the craft while it is in the air, or to make a forced parachute jump, the construction shown in Figs. 7, 8, 9 and 10 by virtue of its being rotatable and eliminatable as a possible rearward obstruction, enables the occupant to easily and quickly jump without any danger of becoming entangled with, or fouling, the usual fixed, or differently-openable, rearmost canopy section. The structure of the present invention thus not only provides an improved gun-housing, but an improved emergency exit. The term "power means" employed throughout the specification and claims is intended to embrace such actuating means as a motor, a spring, an elastic band or a weight for moving the cover to open position; and the term "manual means" is intended to include means operable by the hand, foot or other parts of the body for rendering the power means effective.

I claim:

1. In an airplane having a fuselage and a cockpit in the upper rear portion thereof; a cover device for said cockpit, said cover device including a longitudinally-tapered, laterally-curved rigid shell portion formed to complete the streamlined outline of the fuselage, means mounting said shell portion for bodily rotation as a unit along an arc about an axis located substantially within the fuselage substantially in the vertical plane of symmetry thereof and substantially parallel to the longitudinal axis of the fuselage, power means for rotating said shell portion about said mounting means to a position within said fuselage to open said cockpit, and manual means for controlling the operation of said power means.

2. In an airplane having a fuselage and a cockpit in the upper rear portion thereof; a cover device for said cockpit, said cover device including a longitudinally-tapered, laterally-curved rigid shell portion formed to complete the streamlined outline of the fuselage, means pivotally mounting said shell portion for bodily rotation as a unit along an arc about an axis located within the fuselage substantially in the vertical plane of symmetry thereof and substantially parallel to the longitudinal axis of the fuselage, power means for rotating said shell portion about said mounting means to a position within said fuselage to open said cockpit, and manual means for controlling the operation of said power means.

3. In an airplane having a fuselage, a gunner's cockpit in the upper rear portion thereof, and a gun mounted within the fuselage to be housed within the cockpit and to extend therefrom when in firing position; a cover device for said cockpit, said cover device including a longitudinally-tapered, laterally-curved rigid shell portion formed to complete the streamlined outline of the fuselage, means mounting said shell portion for bodily rotation as a unit along an arc about an axis located within the fuselage substantially in the vertical plane of symmetry thereof and substantially parallel to the longitudinal axis of the fuselage, power means for rotating said shell portion about its mounting means to a position within said fuselage to open said cockpit to expose the gun, and manual means for controlling the operation of said power means.

4. In an airplane having a fuselage and a cockpit in the upper rear portion thereof; a cover device for said cockpit, said cover device including a forward portion enclosing the forward end of the cockpit, an intermediate portion substantially continuous with the forward portion and bodily slidable into and out of stowed relation therewith, and a rear portion, said rear portion including a longitudinally-tapered, laterally-curved rigid shell portion formed to complete the streamlined outline of the forward and intermediate portions of the cover, means for mounting said shell portion for bodily rotation as a unit along an arc about an axis located within the fuselage substantially in the vertical plane of symmetry thereof and substantially parallel to the longitudinal axis of the fuselage, power means for rotating said shell portion about said mounting means to a position within said fuselage to open said cockpit, and manual means for controlling the operation of said power means.

5. In an airplane having a fuselage and a cockpit in the rear upper portion thereof; a cover device for said cockpit, said cover device including a longitudinally-tapered, laterally-curved rigid shell portion formed to complete the streamlined outline of the fuselage, means mounting said shell portion for bodily rotation as a unit along an arc about an axis located within the fuselage substantially in the vertical plane of symmetry thereof and substantially parallel to the longitudinal axis of the fuselage, power means tending to rotate said shell portion about said mounting means to a position within said fuselage to open said cockpit and a latch for restraining the shell portion against the operation of said power means.

6. In an airplane having a fuselage and a cockpit in the rear upper portion thereof; a cover device for said cockpit, said cover device including a longitudinally-tapered, laterally-curved rigid shell portion formed to complete the streamlined outline of the fuselage, bearings pivotally mounting the opposite ends of said shell portion for bodily rotation as a unit along an arc about an axis located within the fuselage substantially in the vertical plane of symmetry thereof and substantially parallel to the longitudinal axis of the fuselage, power means for rotating said shell portion within said bearings to a position within said fuselage to open said cockpit, and manual means for controlling the operation of said power means.

7. In an airplane having a fuselage and a cockpit in the rear upper portion thereof; a cover device for said cockpit, said cover device including a longitudinally-tapered, laterally-curved rigid shell portion formed to complete the streamlined outline of the fuselage, radius members at opposite ends of the shell portion, said radius members being pivotally mounted for bodily rotating said shell portion as a unit along an arc about an axis located within the fuselage substantially in the vertical plane of symmetry thereof and substantially parallel to the longitudinal axis of the fuselage, power means for rotating said shell portion and radius members about said pivotal mounting means to a position within said fuselage to open said cockpit, and manual means for controlling the operation of said power means.

8. In an airplane having a fuselage, a gunner's cockpit in the upper rear portion thereof, and a gun mounted within the fuselage to be housed within the cockpit and to extend therefrom when in firing position; a cover device for said cockpit, said cover device including a longitudinally-tapered, laterally-curved rigid shell portion formed to complete the streamlined outline of the fuselage, means for pivotally mounting said shell portion for bodily rotation as a unit along an arc about an axis located within the fuselage substantially in the vertical plane of symmetry thereof and substantially parallel to the longitudinal axis of the fuselage, torsion means associated with said pivotal mounting means tending to rotate said shell portion to a position within said fuselage to open said cockpit and expose the gun, and a latch for restraining the shell against the operation of the torsion means.

9. In an airplane having a fuselage and a cockpit in the upper rear portion thereof; a cover device for said cockpit, said cover device including a longitudinally-tapered, laterally-curved rigid shell portion formed to complete the streamlined outline of the fuselage, means mounting said shell portion for bodily rotation as a unit along an arc about an axis located within the fuselage substantially in the vertical plane of symmetry thereof and substantially parallel to the longitudinal axis of the fuselage, guides secured to said shell portion and extending concentrically of its axis of rotation, stationarily mounted rollers engaging the guides, power means for rotating said shell portion about said mounting means to a position within said fuselage to open said cockpit, and manual means for controlling the power means.

10. In an airplane having a fuselage and a cockpit in the upper rear portion thereof; a cover device for said cockpit, said cover device being longitudinally divided to provide a pair of complementary, longitudinally-tapered, laterally-curved rigid shell portions formed to complete the streamlined outline of the fuselage, means mounting said shell portions for bodily rotation along an arc about an axis located within the fuselage substantially in the vertical plane of symmetry thereof and substantially parallel to the longitudinal axis of the fuselage, power means for rotating said shell portions in opposite directions about said mounting means to positions within said fuselage to open said cockpit, and manual means for controlling the operation of said power means.

11. In an airplane having a fuselage and a cockpit in the upper rear portion thereof; a cover device for said cockpit, said cover device including a longitudinally-tapered, laterally-curved rigid shell portion formed to complete the streamlined outline of the fuselage, means mounting said shell portion for bodily rotation as a unit along an arc about an axis located within the fuselage substantially in the vertical plane of symmetry thereof and substantially parallel to the longitudinal axis of the fuselage, a rack upon the shell portion, a pinion engaging said rack, power means for driving said pinion for rotating said shell portion about said mounting means to a position within said fuselage to open said cockpit, and manual means for controlling the operation of said power means.

12. In an airplane having a fuselage and a cockpit in the upper rear portion thereof; a cover device for said cockpit, said cover device being longitudinally divided to provide a pair of complementary, longitudinally-tapered, laterally-curved rigid shell portions formed to complete the streamlined outline of the fuselage, pivotal means mounting said shell portions for bodily rotation along an arc about an axis located within the fuselage substantially in the vertical plane of symmetry thereof and substantially parallel to the longitudinal axis of the fuselage, racks upon the shell portions extending in the direction of curvature of the shell portions, stationarily mounted pinions engaging said racks, power means for driving said pinions for rotating said shell portions in opposite directions about said pivotal mounting means to positions within said fuselage to open said cockpit, and manual means for controlling the operation of said power means.

13. In an airplane having a fuselage, a gunner's cockpit in the upper rear portion thereof, and a gun mounted within the fuselage to be housed within the cockpit and to extend therefrom when in firing position; a cover device for said cockpit said cover device being longitudinally divided to provide a pair of complementary, longitudinally-tapered, laterally-curved rigid shell portions formed to complete the streamlined outline of the fuselage, means mounting said shell portions for bodily rotation along an arc about an axis located within the fuselage substantially in the vertical plane of symmetry thereof and substantially parallel to the longitudinal axis of the fuselage, power means for rotating said shell portions in opposite directions about said mounting means to positions within said fuselage to open said cockpit and expose the gun, and manual means for controlling the operation of said power means.

ALEXANDER P. de SEVERSKY.